United States Patent [19]

Makara et al.

[11] 3,717,721

[45] Feb. 20, 1973

[54] AUTOMATIC CHROMA COMPENSATING SYSTEM

[75] Inventors: Satoshi Makara; Kazuo Kashigi; Yasuhiro Taniguchi, all of Tokyo, Japan

[73] Assignee: Nippon Electric Company, Limited, Tokyo, Japan

[22] Filed: Oct. 12, 1971

[21] Appl. No.: 188,182

[30] Foreign Application Priority Data

Oct. 14, 1970 Japan ................................45/90802

[52] U.S. Cl. ........................178/5.4 AC, 178/5.4 CD

[51] Int. Cl. ...............................................H04n 9/48

[58] Field of Search ........178/5.4 R, 5.4 AC, 5.4 CD, 178/69.5 CB

[56] References Cited

UNITED STATES PATENTS

| | | | |
|---|---|---|---|
| 3,381,083 | 4/1968 | Jensen et al. | 178/5.4 CD |
| 3,604,842 | 9/1971 | Harwood | 178/5.4 AC |

*Primary Examiner*—Richard Murray
*Attorney*—Sandoe, Hopgood and Calimafde

[57] ABSTRACT

To compensate the chroma component of a color video signal produced by a playback apparatus having a plurality of magnetic heads, the amplitude of selected color burst signals derived from the video signal is detected and stored. At least the first and last signals of each head-channel period are included. A difference signal indicative of the difference between adjacent detected amplitude components is generated, and added to the stored amplitude components to form a control signal. The amplitude of the chroma component of the composite color video signal is varied in response to this control signal.

4 Claims, 5 Drawing Figures

AUTOMATIC CHROMA COMPENSATING SYSTEM

BACKGROUND OF THE INVENTION

This invention relates to an automatic chroma compensating system for a multi-head color video tape playback apparatus, and more particularly a playback apparatus, in which the amplitude variation of the chroma signal component of a color TV video signal taken from a four-head reproducing means is compensated electronically.

In a conventional four-head playback apparatus, the video signal recorded on a tape is converted into an electrical signal by four magnetic heads, assigned to four head channels respectively. The signals from the four head channels are reproduced in succession by their respective heads. These signals are synthesized into a continuous video signal by a switcher and then converted into a composite video signal by a demodulator. However, the phase of this composite video signal is unstable. In the case of a composite color video signal particularly the color phase is so unstable that it is not suitable for broadcasting. Therefore, a video signal compensating circuit is used to suppress the unstable component to such an extent that the video signal is usable for broadcasting purposes. The video signal is then applied to a synchronizing signal shaping circuit, where the synchronizing signal is reshaped or replaced. In this way, a composite video signal suitable for broadcasting is produced.

Because the information transfer from the tape to the magnetic heads depends on mechanical pressure to which brings the tape into contact with the heads, the variation in chroma component is unavoidable even within single head channel period, due to variations in contact pressure. Also, the moreover differences in electromagnetic characteristics between one magnetic head and another cause chroma component variations between head channels.

The video signal from the demodulator is applied to a video signal compensating circuit which removes jitter and other undesirable effects. The signal is then divided into the luminance and chroma components by a Y-C separation circuit. The chroma component of the separated chroma signal is suppressed by a chroma signal amplitude modulator. The suppressed signal is mixed with the luminance signal by a Y-C mixer circuit. The burst signal is picked up from the output of the modulator by a burst gate circuit, and the mean value of the burst signals of each head channel is used as a control signal for the amplitude modulator.

In the above arrangement, it is possible to suppress the amplitude varying components of the chroma signals between the head channels. However, the amplitude varying component observed within one head channel period is not fully compensated. Therefore, it is difficult to obtain a satisfactory color video signal.

A device for compensating the chroma amplitude varying component at each burst period of one horizontal period has also been suggested. In this system, however, there is a possibility of erroneous compensation when noise is superimposed on the burst signal. To avoid this, a costly and complex device must be used.

It is, therefore, an object of this invention to provide an automatic chroma compensating system in which the chroma signal amplitude variation is compensated in a more satisfactory manner.

SUMMARY OF THE INVENTION

According to this invention, an automatic chroma compensating system is provided in which the amplitude variation of the chroma signal between the head channels is suppressed, and the mean value of the burst signals at suitable points in each head channel over a certain number of head channels is obtained at each point. Thus the amplitude variation component of the chroma signal within each channel is also suppressed, whereby a color video signal of superior quality is produced. Suitable points that indicate the burst signal parts of horizontal video signals include at least the first and the 16th of 16 horizontal video signals reproduced by each of the four magnetic heads. In a four-head arrangement, 16 or 17 horizontal video signals are normally reproduced per head channel. It is, thus, assumed here that the 17th signal is approximated by the 16th signal and that 16 horizontal video signals are reproduced per head channel.

BRIEF DESCRIPTION OF THE DRAWINGS

Other features and advantages of the invention will be understood from the following detailed description of a preferred embodiment of this invention taken in conjunction with the accompanying drawing, wherein.

DESCRIPTION OF THE PREFERRED EMBODIMENT

Figure 1:
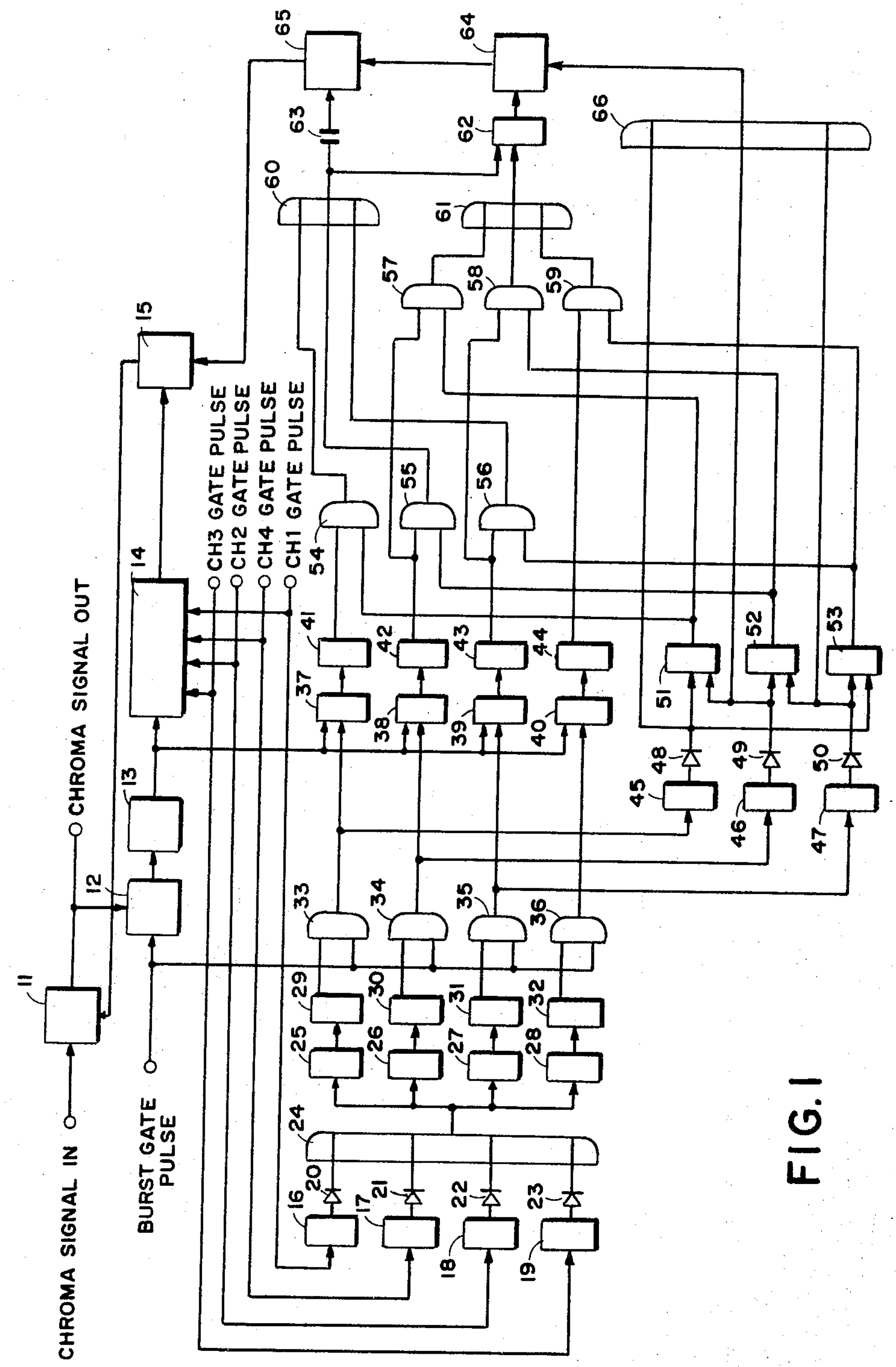
FIG. 1 is a block diagram of an embodiment of the invention.
Figure 4:
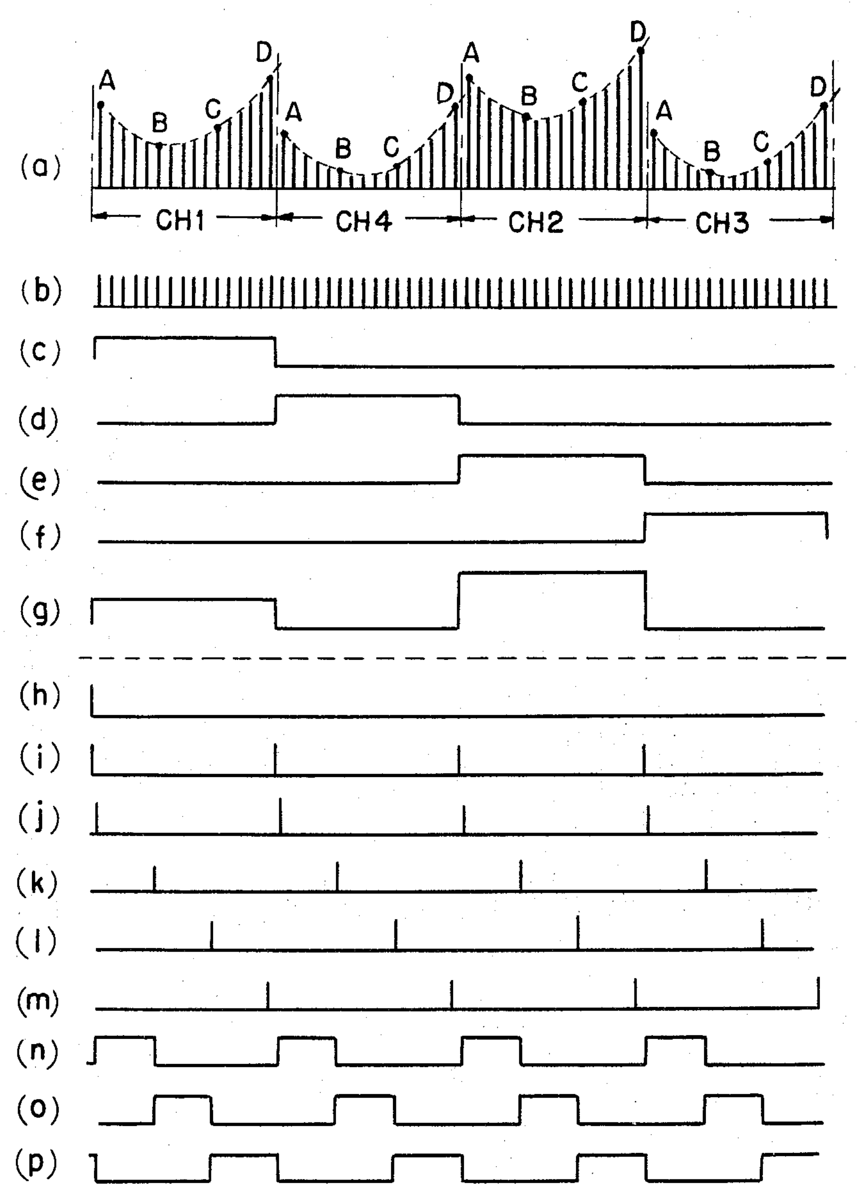
FIGS. 4 and 5 show waveforms observed at various points in the embodiment shown in FIG. 1.

A continuous composite video signal is supplied to the input of an amplitude modulator 11 shown in FIG. 1. The output of the amplitude modulator 11 is supplied to a burst gate circuit 12, and a burst gate pulse is, thus, applied as a drive pulse to the burst gate 12. The burst gate pulse shown in FIG. 4*b*, is formed, by the composite synchroning signal reproduced from the tape, and corresponds to the burst signal part of each horizontal video signal. The signal, with only the burst signal portions gated, is applied to an envelope detector circuit 13. The waveform of the output of the detector circuit 13, including signals from all four channels, is shown in FIG. 4*a*. Points A, B, C, and D are selected within the individual channels. These points exist in each channel.

Figure 2:
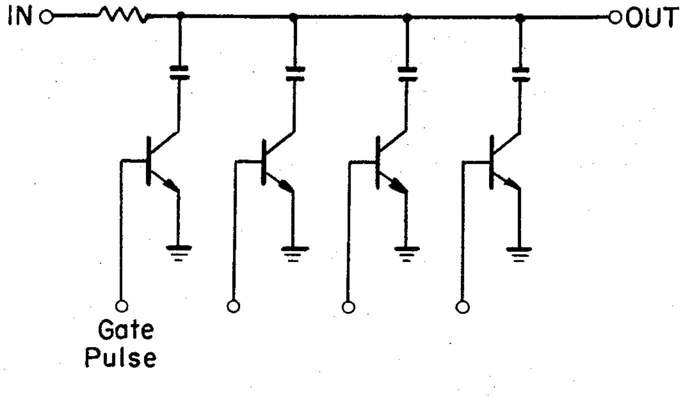
FIGS. 2 and 3 are circuit diagrams of portions of the embodiment shown in FIG. 1.

A control signal, shown in FIG. 4*g*, is obtained from the envelope-detected signal by a coarse compensating signal generator circuit 14. An example of this compensating signal generator is shown in FIG. 2 wherein the channel gate pulses shown as in FIGS. 4*c* through *f*, are applied to the bases of the transistors, whereby the mean values of the individual channels are stored in the memory capacitors connected to the collectors of the transistors respectively, and the control signal *g* is obtained at the output. By using this signal *g* to control the amplitude modulator 11, it is possible to suppress the amplitude variation component of the chroma signals between the head channels.

The channel gate pulses shown in FIGS. 4c through 4f are differentiated by circuits 16 through 19 respectively whereby positive and negative differentiated pulses are formed. Diodes 20 through 23 are used to obtain the differentiated pulses occuring at the leading edges of the individual channel gate pulses. Taking a CH1 gate pulse shown an example, a pulse as in FIG. 4h appears in the position corresponding to the leading edge of CH1 gate pulse. Similarly, pulses appear in the positions corresponding to the leading edges of the gate pulses of CH2 through CH4, respectively. These pulses are supplied to an OR gate circuit 24 to form pulses shown in FIG. 4i, which appear at the joints between the head channels. Time adjustment multivibrators 25 through 28 form gate pulses by which the potential at the points A through D is detected. Multivibrators 29 through 32 produce pulses each having a pulse width slightly greater than the burst gate pulse *b*. The burst gate pulse *b* and pulses from the multivibrators 29 through 32 are applied to AND gate circuits 33 through 36. The output pulses *j* through *m* of the AND gates 33 through 36 are supplied to sampling gate circuits 37 through 40 so as to sample the envelope of the output signal of said envelope detector circuit 13. The individual gate circuits detect the potentials at the points A through D, and these potentials are held temporarily by capacitor memory circuits 41 through 44.

Figure 5:
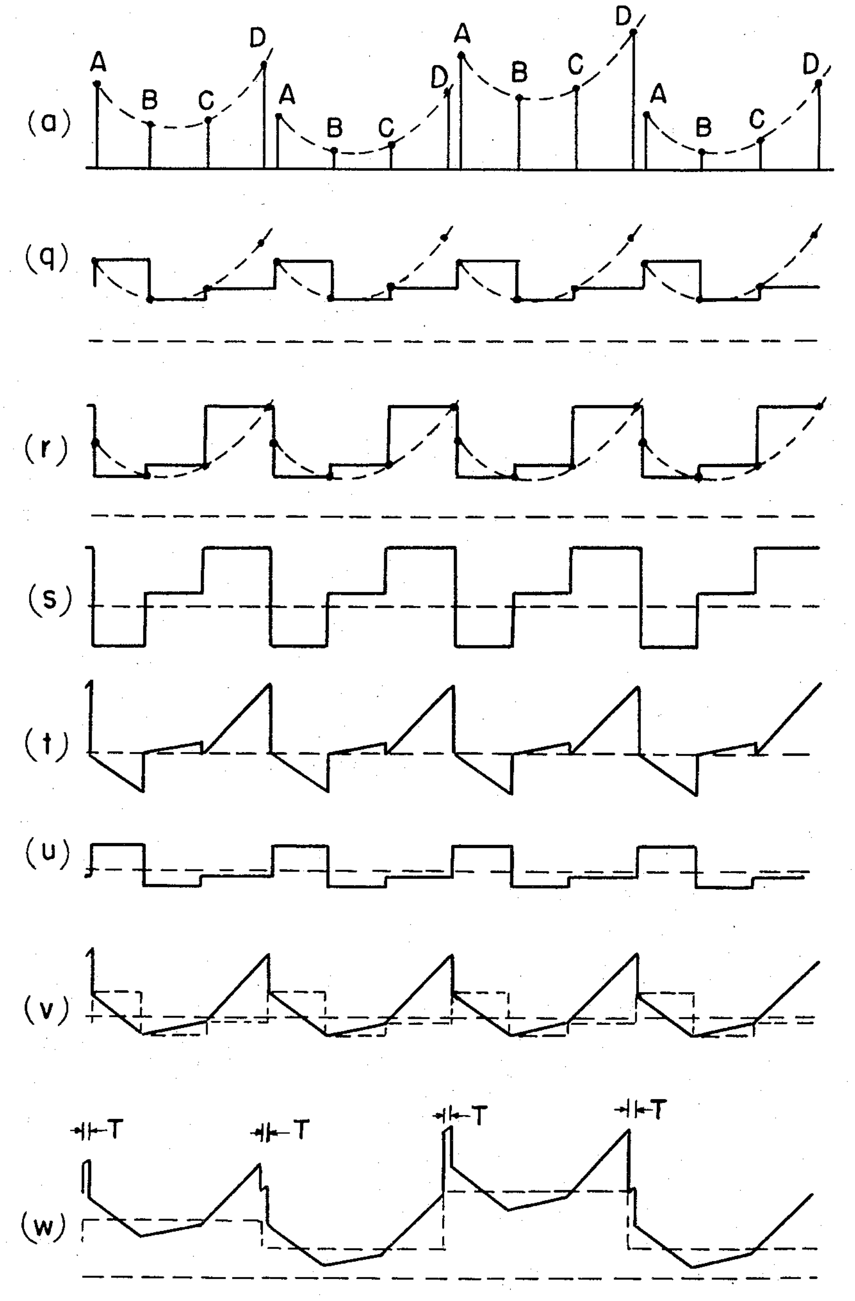

The pulses *j*, *k* and *l* are differentiated by circuits 45, 46 and 47, and pulses corresponding to the leading edges of the gate pulses are removed by diodes 48, 49 and 50. A flip-flop 51 is turned on while a flip-flop 53 is turned off by the output of the diode 48. Similarly a flip-flop 52 is turned on, while the flip-flop 51 off by the output of the diode 49. Likewise, the flip-flop 53 is turned on, and the flip-flop 52 is turned off by the output of the diode 50. Thus, A-B, B-C and C-A gate pulses *m*, *o* and *p* are obtained at the output of the flip-flops 51, 52 and 53, respectively. In AND gate circuits 54 and 57, the outputs of the capacitor memory circuits 41 and 42, and the A-B gate pulse are AND gated, respectively. Similarly, in AND gate circuits 55 and 58, the outputs of the capacitor memory circuits 42 and 42, and the B-C gate pulse are AND gated, and in AND gate circuits 56 and 59, the outputs of the capacitor memory circuits 43 and 44, and the C-A gate pulse are AND gated, respectively. The outputs of the AND gate circuits 54, 55 and 56 in FIG. 2 are supplied to the OR gate circuit 60. Similarly the outputs of the AND gate circuits 57, 58 and 59 are supplied to the OR gate circuit 61. Because the mean values over a certain number of head channels at the points A through D are stored in the capacitor memory circuits 41 through 44, respectively, a waveform shown in FIG. 5q, is obtained at the output of OR gate circuit 60. Also, a waveform, shown in FIG. 5r, is obtained at the output of OR gate circuit 61. The waveform indicated in FIG. 5a is the same as that shown in FIG. 4a.

Figure 3:
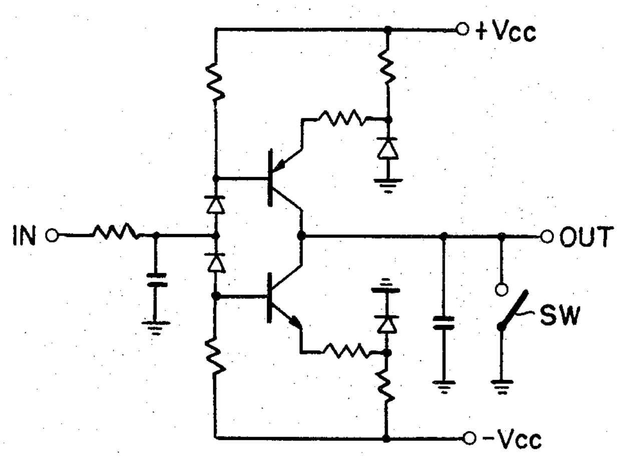

The output *q* of the OR gate circuit 60 is subtracted from the output *r* of the OR gate circuit 61 by a subtractor circuit 62 whereby a waveform shown in FIG. 6s is obtained. The waveform *s* is supplied to an integrator 64 whereby a saw-tooth wave signal shown in FIG. 5t, is obtained. An example of the integrator 64 is shown in FIG. 3. in which an electronic switch SW turns on at the time position corresponding to the points A, B and C. This switch is driven in the following manner. The output pulses *n*, *o* and *p* of the diodes 48, 49 and 50 are OR-gated by an OR gate circuit 66, and the gated output pulses (i.e., the pulses at the time positions corresponding to the points A, B and C) are used to drive the switch SW.

The output waveform *q* of the OR gate circuit 60 contains a DC component as shown in FIG. 5q. The DC component is removed by a capacitor 63 to obtain a waveform shown in FIG. 5u, which represents only the roughly-approximated variation component of the chroma value within a head channel. Then, the roughly-approximated signal *u* and the saw-tooth wave signal *t* are added to each other by an adder circuit 65 whereby a signal, shown in FIG. 6v, is obtained. The sawtooth wave is actually a difference signal and its slope is proportional to the amplitude difference between adjacent detected amplitude components. The difference signal is thus indicative of these amplitude differences. The signal *v* represents a closely approximated variation component of chroma value within each head channel. The signal *v* is added to the signal *g* by an adder circuit 15 to produce a signal as in FIG. 5w. The signal *w* is used to control the amplitude modulator 11 whereby a chroma signal having a constant amplitude is obtained as the output of the modulator 11.

A period T, shown in FIG. 5w, depends on the difference in phases among the channel gate pulses *c* through *f* and A-B, B-C and C-A gate pulses. In practice, the period T occurs during the horizontal blanking period of the horizontal video signal and difficulties are, thus, avoided because no chroma signal is present during this period.

Numerous variations and modifications of the exemplary embodiment of the invention described above will, no doubt, occur to those skilled in the art. The invention is not intended to be limited, however, except as defined by the following claims.

We claim:

1. An automatic chroma compensating circuit for a color video tape playback apparatus having a plurality of magnetic heads comprising:
   - means for deriving a color burst signal from a reproduced composite color video signal;
   - means for detecting the amplitude components of selected predetermined color burst signals including at least the first and last color burst signals in each head-channel period;
   - means for storing the detected amplitude components;
   - means for generating a difference signal indicative of the amplitude difference between adjacent detected amplitude components;
   - means for forming a control signal by adding the stored amplitude components to the difference signal; and
   - means responsive to the control signal for varying the amplitude of the chroma component of said composite color video signal.

2. An automatic chroma compensating circuit for a color video tape playback apparatus having a plurality of magnetic heads comprising:
   - means for deriving a color burst signal from a reproduced composite color video signal;
   - means for detecting the amplitude components of selected predetermined color burst signals including at least the first and last color burst signals in each headtchannel period;

means for storing the detected amplitude components;

means for generating a sawtooth wave having a slope proportional to the amplitude difference between adjacent detected amplitude components;

means for forming a control signal by adding the stored amplitude components to said sawtooth wave; and means responsive to the control signal for varying the amplitude of the chroma component of said composite color video signal.

3. A method of chroma compensation for use in a color video tape playback system employing a plurality of magnetic heads comprising:

deriving a color burst signal from a reproduced color composite video signal;

detecting the amplitude of selected predetermined color burst signals including at least the first and last color burst signals in each head-channel period;

storing the detected amplitude components;

generating a difference signal indicative of the amplitude difference between adjacent detected amplitude components;

forming a control signal by adding the stored amplitude components to said sawtooth wave; and varying the amplitude of the chroma component of the composite color signal in response to the control signal.

4. The method of claim 3 wherein the difference signal is a sawtooth wave having a slope proportional to the difference between adjacent detected amplitude components.

* * * * *